(12) United States Patent
Kim

(10) Patent No.: US 9,625,131 B2
(45) Date of Patent: Apr. 18, 2017

(54) BACKLIGHT UNIT AND DISPLAY DEVICE INCLUDING THE SAME

(71) Applicant: Samsung Display Co. Ltd., Yongin, Gyeonggi-Do (KR)

(72) Inventor: Gi Cherl Kim, Asan-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 115 days.

(21) Appl. No.: 14/312,947

(22) Filed: Jun. 24, 2014

(65) Prior Publication Data

US 2015/0219324 A1   Aug. 6, 2015

(30) Foreign Application Priority Data

Feb. 5, 2014 (KR) .......................... 10-2014-0013184

(51) Int. Cl.
| | | |
|---|---|---|
| *G02F 1/133* | (2006.01) | |
| *F21V 21/00* | (2006.01) | |
| *G02F 1/1335* | (2006.01) | |
| *G02F 1/1333* | (2006.01) | |
| *F21V 8/00* | (2006.01) | |
| *F21Y 101/00* | (2016.01) | |

(52) U.S. Cl.
CPC .......... *F21V 21/00* (2013.01); *G02B 6/0088* (2013.01); *G02F 1/1336* (2013.01); *G02F 1/133305* (2013.01); *G02F 1/133308* (2013.01); *G02F 1/133603* (2013.01); *G02F 1/133608* (2013.01); *G02F 1/133611* (2013.01); *G02F 1/133615* (2013.01); *F21Y 2101/00* (2013.01); *G02F 2001/13332* (2013.01); *G02F 2001/133314* (2013.01)

(58) Field of Classification Search
CPC .................... G02B 6/0088; G02F 1/133615
See application file for complete search history.

(56) References Cited

U.S. PATENT DOCUMENTS

| | | | |
|---|---|---|---|
| 7,159,999 B2 | 1/2007 | Yoo et al. | |
| 7,609,355 B2 | 10/2009 | Nouchi et al. | |
| 7,667,786 B2 | 2/2010 | Nouchi et al. | |
| 7,903,196 B2 | 3/2011 | Koganezawa | |
| 2007/0146569 A1* | 6/2007 | Nouchi ................ | G02B 6/0088 349/58 |

(Continued)

FOREIGN PATENT DOCUMENTS

| | | |
|---|---|---|
| JP | 2010-217702 A | 9/2010 |
| JP | 2010-266603 A | 11/2010 |

(Continued)

*Primary Examiner* — Phu Vu
(74) *Attorney, Agent, or Firm* — Cantor Colburn LLP

(57) ABSTRACT

A backlight unit includes a lower container including a bottom surface which is flat, an optical member accommodated in the lower container, having a concave curve along one direction of the bottom surface and protruding toward a center portion of the bottom surface, a plurality of supporters which contacts the bottom surface and projects toward the optical member to support the optical member, and a plurality of light sources disposed on the bottom surface and arranged between the optical member and the bottom surface, where a density of the plurality of light sources increases along the one direction towards the center portion of the bottom surface.

20 Claims, 28 Drawing Sheets

(56) References Cited

U.S. PATENT DOCUMENTS

| | | | | |
|---|---|---|---|---|
| 2008/0094853 A1* | 4/2008 | Kim | ................. | G02B 6/0018 |
| | | | | 362/612 |
| 2009/0059126 A1* | 3/2009 | Koganezawa | .... | G02F 1/133611 |
| | | | | 349/64 |
| 2009/0316062 A1 | 12/2009 | Nishizawa | | |
| 2013/0003352 A1* | 1/2013 | Lee | ................. | G02B 6/0096 |
| | | | | 362/97.1 |

FOREIGN PATENT DOCUMENTS

| | | |
|---|---|---|
| JP | 2013-182854 A | 9/2013 |
| KR | 1020080068695 A | 7/2008 |

\* cited by examiner

BACKLIGHT UNIT AND DISPLAY DEVICE INCLUDING THE SAME

This application claims priority to Korean Patent Application No. 10-2014-0013184, filed on Feb. 5, 2014 in the Korean Intellectual Property Office, and all the benefits accruing therefrom under 35 U.S.C. §119, the disclosure of which is incorporated herein in its entirety by reference.

BACKGROUND

1. Field

The invention relates to a backlight unit and a display device including the same.

2. Description of the Prior Art

A liquid crystal display ("LCD") is given much weight in the information display technology. The LCD displays information in a manner that liquid crystals, which are inserted between two glass substrates, emit light through application of a power to electrodes positioned on upper and lower portions of the glass substrates.

The LCD is a light receiving device which is not self-luminous and thus displays an image through adjustment of permeability of light that is input from an outside, and thus requires a separate device for irradiating a liquid crystal panel with light, that is, a backlight unit.

As the LCD has a large size, a difference in viewing angle between a case where a viewer sees the center portion of a screen and a case where the viewer sees a left or right end portion of the screen is increased. Accordingly, researches for reducing such a difference in viewing angle have been made.

In order to overcome the difference in viewing angle, a method to form a curved screen of a LCD based on the center portion of the screen has recently been proposed, and a LCD that adopts a curved panel has been used.

Accordingly, researches for configurations of a backlight unit that can be appropriately adopted in a display device having a curved panel and other display devices have been made.

SUMMARY

Accordingly, one subject to be solved by the invention is to provide a backlight unit, which can secure uniform luminance distribution even in the case where a curved panel is adopted.

Another subject to be solved by the invention is to provide a backlight unit, which can be easily kept and transported even in the case of a display device that adopts a curved panel, and can be easily mounted even when a user uses the display device.

Additional advantages, subjects, and features of the invention will be set forth in part in the description which follows and in part will become apparent to those having ordinary skill in the art upon examination of the following or may be learned from practice of the invention.

In one exemplary embodiment of the invention, there is provided a backlight unit including a lower container including a bottom surface which is flat, an optical member accommodated in the lower container and having a concave curve along one direction of the bottom surface and protruding toward a center portion of the bottom surface, a plurality of supporters which contacts with the bottom surface and projects toward the optical member to support the optical member, and a plurality of light sources disposed on the bottom surface and arranged between the optical member and the bottom surface, where a density of the plurality of light sources increases along the one direction towards the center portion the bottom surface.

In an exemplary embodiment, heights of the plurality of supporters may decrease along the one direction towards the center portion of the bottom surface.

In an exemplary embodiment, the plurality of supporters may be disposed in a plurality of lines extended parallel to the one direction of the bottom surface.

In an exemplary embodiment, the plurality of supporters may be disposed on four corners of the bottom surface, respectively.

In an exemplary embodiment, the plurality of supporters may respectively include a column which contacts the bottom surface and projects upward and a support surface which is configured to support the optical member, where inclinations of the plurality of support surfaces of the plurality of supporters become smaller in the one direction towards the center portion of the bottom surface.

In an exemplary embodiment, the plurality of supporters may respectively extend in parallel to the one direction of the bottom surface, and opposing ends thereof face opposing ends of the bottom surface in the one direction, and each supporter is curved along the one direction of the bottom surface, and a height of the supporter decreases in the one direction towards the center portion of the bottom surface.

In an exemplary embodiment, the backlight unit may further include an upper container arranged on an upper portion of the optical member, where the optical member, the plurality of supporters, and the plurality of light sources are accommodated between the upper container and the lower container, and a shape of the upper container corresponds to a shape of the optical member.

In an exemplary embodiment, the plurality of light sources may respectively include a plurality of printed circuit boards ("PCBs") on which a plurality of LED packages is arranged in a line, and the plurality of PCBs is arranged in a direction that is perpendicular to the one direction of the bottom surface.

In an exemplary embodiment, a gap between the neighboring PCBs may be shortened in the one direction towards the center portion of the bottom surface.

In an exemplary embodiment, the number of the plurality of LED packages arranged on a PCB of the plurality of printed circuit boards may be increased in the one direction towards the center portion of the bottom surface.

In an exemplary embodiment, driving currents of the plurality of PCBs may be decreased in the one direction towards the center portion of the bottom surface.

In an exemplary embodiment, luminances of the plurality of LED packages may be lowered in the one direction towards the center portion of the bottom surface.

In an exemplary embodiment, the light source may include a plurality of PCBs on which a plurality of LED packages is arranged in a line, and the plurality of PCBs is arranged in parallel to the one direction of the bottom surface.

In an exemplary embodiment, a gap between neighboring light emitting diode packages of the plurality of LED packages of the PCB may be shortened in the one direction towards the center portion of the bottom surface.

In an exemplary embodiment, luminances of the plurality of LED packages may be arranged in the one direction towards the center portion of the bottom surface.

In an exemplary embodiment, driving currents of the plurality of LED packages may be lowered in the one direction towards the center portion of the bottom surface.

In another exemplary embodiment of the invention, there is provided a display device including a lower container including a flat bottom surface, an upper container having a concave curve along one direction of the bottom surface and protruding toward a center portion of the bottom surface, an optical member interposed between the lower container and the upper container and including a shape that corresponds to a shape of the upper container, a light source disposed between the optical member and the bottom surface, and a display panel arranged on the upper container and including the shape that corresponds to the shape of the upper container.

In an exemplary embodiment, the display device may further include a top chassis which fixes the display panel, where the top chassis includes a concave curve along the one direction of the bottom surface and protruding toward the center portion of the bottom surface.

In still another exemplary embodiment of the invention, there is provided a display device including a lower container including a flat bottom surface and a plurality of side wall portions, an upper container having a concave curve provided toward a center portion of the bottom surface, a light guide plate interposed between the lower container and the upper container and including a shape that corresponds to a shape of the upper container, a light source arranged on a side wall portion of the lower container and a side surface of the light guide plate, and a display panel arranged on the upper container and including the shape that corresponds to the shape of the upper container.

In an exemplary embodiment, the light guide plate may include a reflection pattern, and a density of a reflection pattern of the light guide plate is increased as the reflection pattern is further from the light source.

According to the exemplary embodiments of the invention, at least the following effects can be achieved.

That is, the backlight unit can be easily kept and transported, and can be easily mounted and used when the user installs the display device.

Further, the difference in viewing angle between the center portion and the left or right end portion of the display panel can be effectively reduced, and the uniform luminance distribution can be secured even in the case of adopting the curved display panel.

The effects according to the invention are not limited to the contents as exemplified above, but further various effects are included in the description.

BRIEF DESCRIPTION OF THE DRAWINGS

The above and other objects, features and advantages of the invention will be more apparent from the following detailed description taken in conjunction with the accompanying drawings, in which.

DETAILED DESCRIPTION

Figure 1:
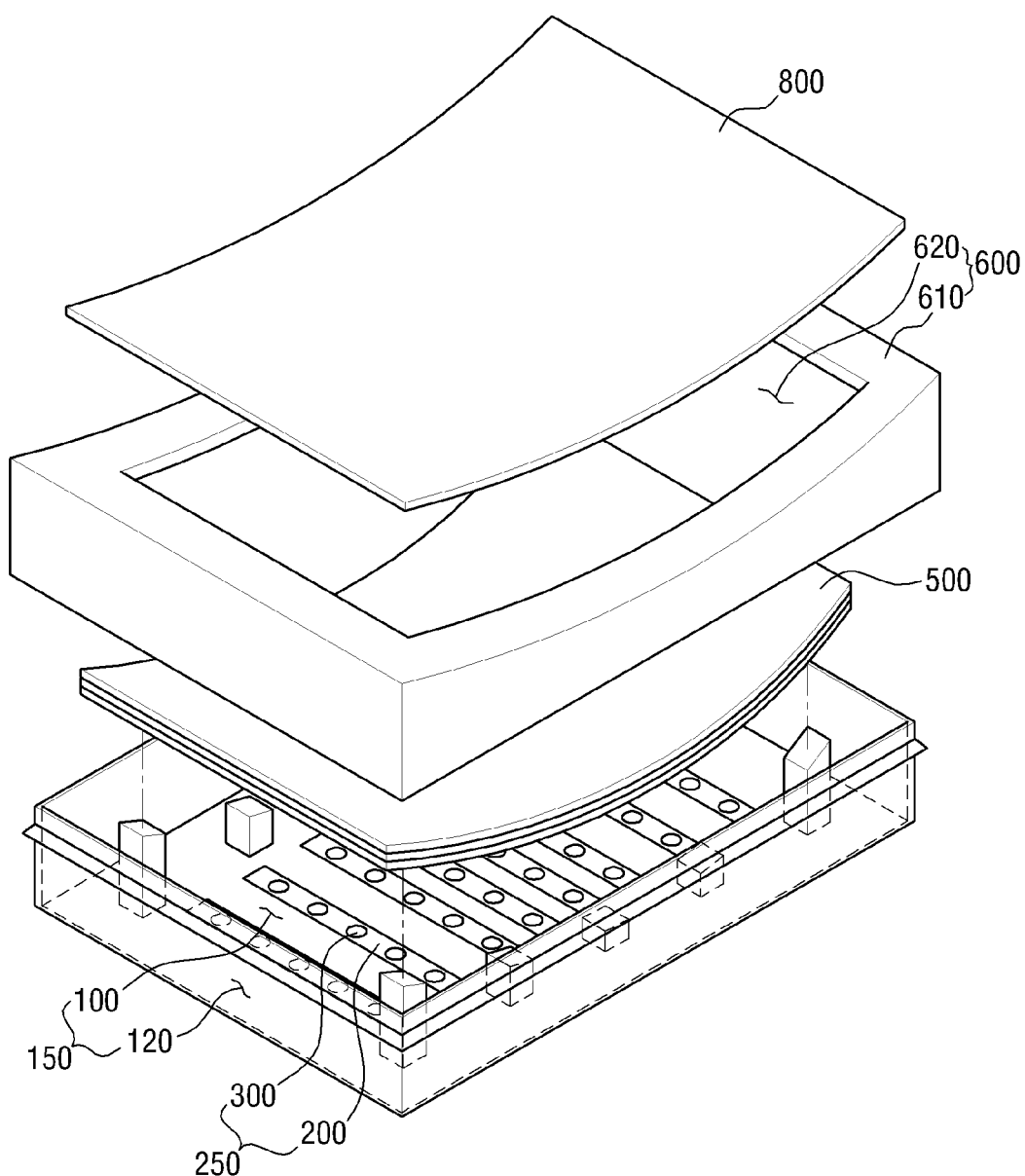
FIG. 1 is a perspective view of an exemplary embodiment of a backlight unit on which a display panel is seated according to the invention.

The exemplary embodiments and features of the invention and methods for achieving the exemplary embodiments and features will be apparent by referring to the exemplary embodiments to be described in detail with reference to the accompanying drawings. However, the invention is not limited to the exemplary embodiments disclosed hereinafter, but can be implemented in diverse forms. The matters defined in the description, such as the detailed construction and elements, are nothing but specific details provided to assist those of ordinary skill in the art in a comprehensive understanding of the invention, and the invention is only defined within the scope of the appended claims. In the entire description of the invention, the same reference numerals are used for the same elements across various figures. In the drawings, sizes and relative sizes of layers and areas may be exaggerated for clarity in explanation.

The term "on" that is used to designate that an element is on another element located on a different layer or a layer includes both a case where an element is located directly on another element or a layer and a case where an element is located on another element via another layer or still another element.

Although the terms "first, second, and so forth" are used to describe diverse constituent elements, such constituent elements are not limited by the terms. The terms are used only to discriminate a constituent element from another constituent element. Accordingly, in the following description, a first constituent element may be a second constituent element.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described with reference to the accompanying drawings.

FIG. 1 is a perspective view of a backlight unit on which a display panel is seated according to an exemplary embodiment of the invention.

Referring to FIG. 1, a backlight unit may include a lower container 150 including a flat bottom surface 100, and an optical member 500 accommodated in the lower container 150 and having a concave curve provided in one direction (e.g., along X axis in FIG. 23) on the bottom surface 100. Further, the backlight unit may include a frame 610 and an upper container 600 defining an opening 620 therein to fix the optical member 500, and a display panel 800 provided with a curve in a shape that corresponds to the optical member 500 may be seated on an upper portion of the backlight unit.

Referring to the cross-sectional view of FIG. 2, the configuration of the backlight unit that is arranged on the lower container 150 will be described. The lower container 150 may include the flat bottom surface 100 and a plurality of side wall portions 120, and may further include a plurality of column-shaped supporters 400 which come in contact with the bottom surface 100 and project toward the optical member 500 to support the optical member 500. Further, the backlight unit may include a plurality of light sources 250 arranged between the bottom surface 100 and the optical member 500, and the density of the light sources 250 may be increased in a direction towards the center portion in one direction of the bottom surface 100. The light sources 250 may include a plurality of printed circuit boards ("PCBs") 200 and a plurality of light emitting diode ("LED") packages 300, which will be described in detail later.

The bottom surface 100 of the lower container 150 may include a flat surface. The optical member 500 may be arranged on an upper portion of the bottom surface 100 of the lower container 150, and the optical member 500 may be accommodated in the plurality of side wall portions 120. The optical member 500 may be supported by the plurality of supports 400 which come in contact with the bottom surface 100 and project toward the optical member 500.

By providing the flat bottom surface 100 of the lower container 150, the rear surface of the display device that includes the backlight unit becomes flat, and thus a user can easily install the display device. In an exemplary embodiment, when the front surface of the display device is curved, the distance between the front surface of the display and a viewer can be equally kept to give an ambience effect. However, when the rear surface thereof is also curved in the same manner as the front surface, it may be difficult for a user to install the display device, or unnecessary space may be wasted. In the case of a wall-mount display device, for example, when the rear surface of the display device is curved, the center portion of the rear surface is projected, and thus the center portion comes in contact with the wall whereas outer portions of the display device are spaced apart from the wall by a predetermined distance. As a result, the unnecessary space is wasted on the outer portions of the rear surface of the display device.

However, when the bottom surface of the lower container has a flat structure according to the invention, waste of the unnecessary space can be prevented on the rear surface of the display device. According to the invention, the curved front surface of the display panel can give an ambience effect to a viewer, and the unnecessary space on the rear surface thereof can feel by the display panel can be reduced to facilitate the user's use of the display device.

Figure 3:
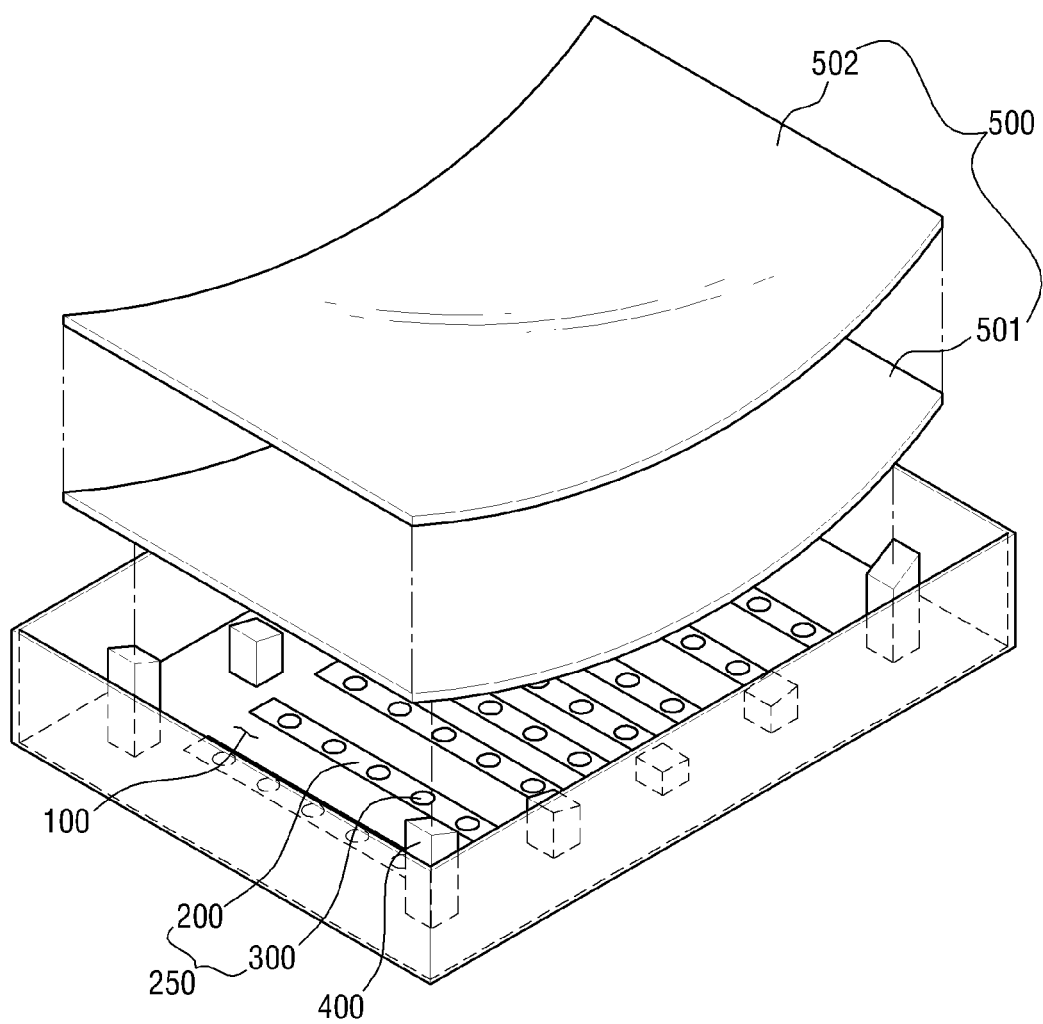
FIG. 3 is a perspective view of the lower container of FIG. 2, in which an optical member is seated.

Referring to FIG. 3, the optical member 500 is seated on upper portions of the supporters 400, and may include, for example, a diffusion plate 501 and a prism sheet 502. Since the supports 400 are structured so that heights thereof are lowered as the supports 400 are disposed closer to the center portion in one direction of the bottom surface 100, the height of the optical member 500 that is seated on the upper portions of the supporters 400 may be lowered in a direction towards the center portion in one direction of the bottom surface 100. That is, the optical member 500 may be concavely curved toward the center portion of the bottom surface 100.

Figure 2:
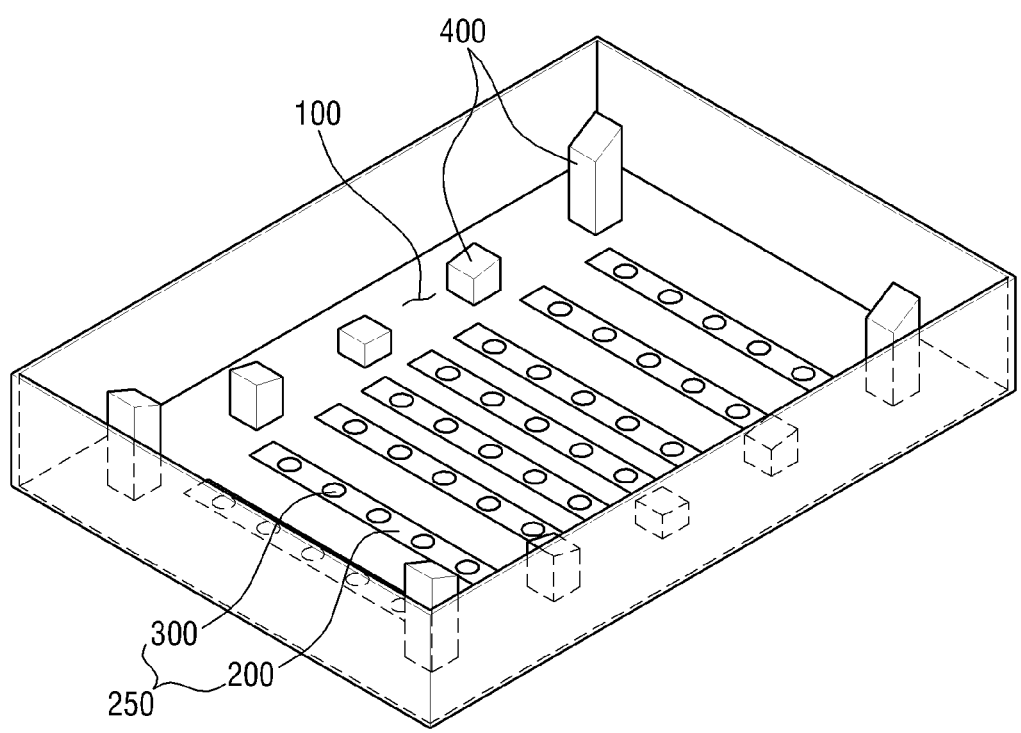
FIG. 2 is a perspective view of an exemplary embodiment of a lower container according to the invention.
Figure 4:
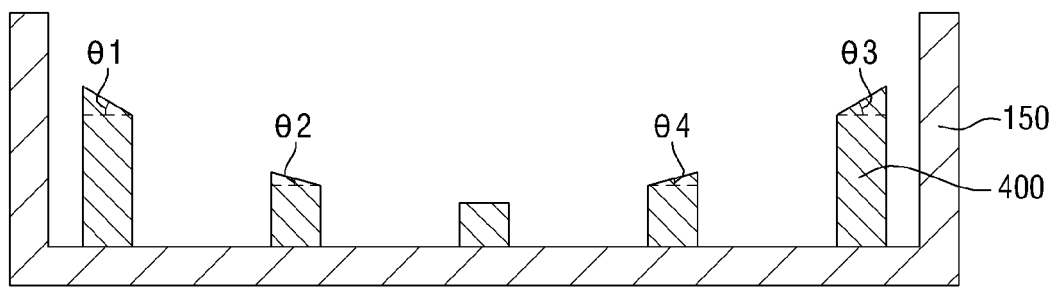
FIG. 4 is a cross-sectional view of FIG. 2.
Figure 5:
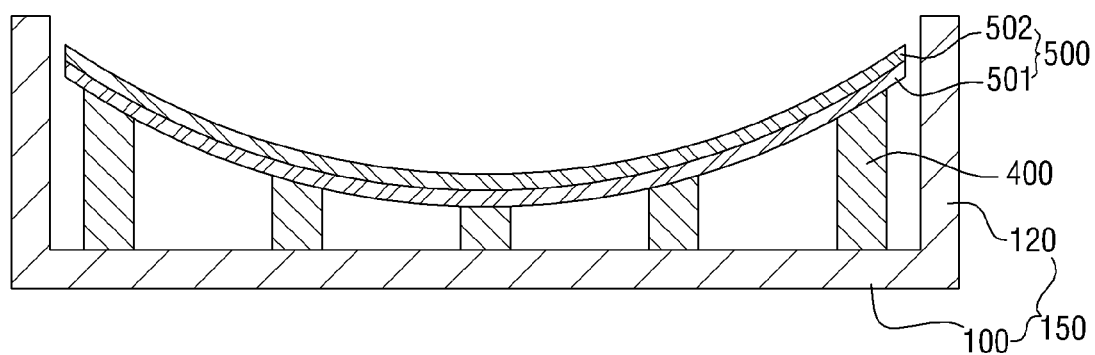
FIG. 5 is a cross-sectional view of FIG. 3.

FIGS. 4 and 5 are cross-sectional views of FIGS. 2 and 3. As shown in FIGS. 4 and 5, the supporters 400 may be provided at the highest height on the outer portion of the bottom surface 100 and may be provided at the lowest height on the center portion of the bottom surface 100. Accordingly, the optical member 500 may be curved toward the bottom surface 100. The supporters 400 may have inclinations 81, 82, 83 and 84, respectively, which will be described in detail later.

Hereinafter, referring to FIGS. 5 to 20, supporters and arrangements thereof according to various embodiments of the invention will be described.

Figure 6:
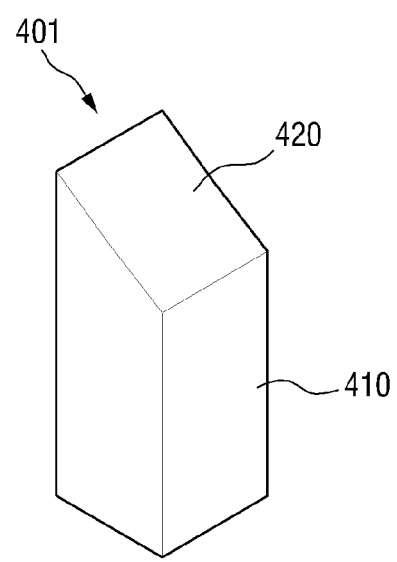
FIG. 6 is a perspective view of an exemplary embodiment of a supporter according to the invention.
Figure 7:
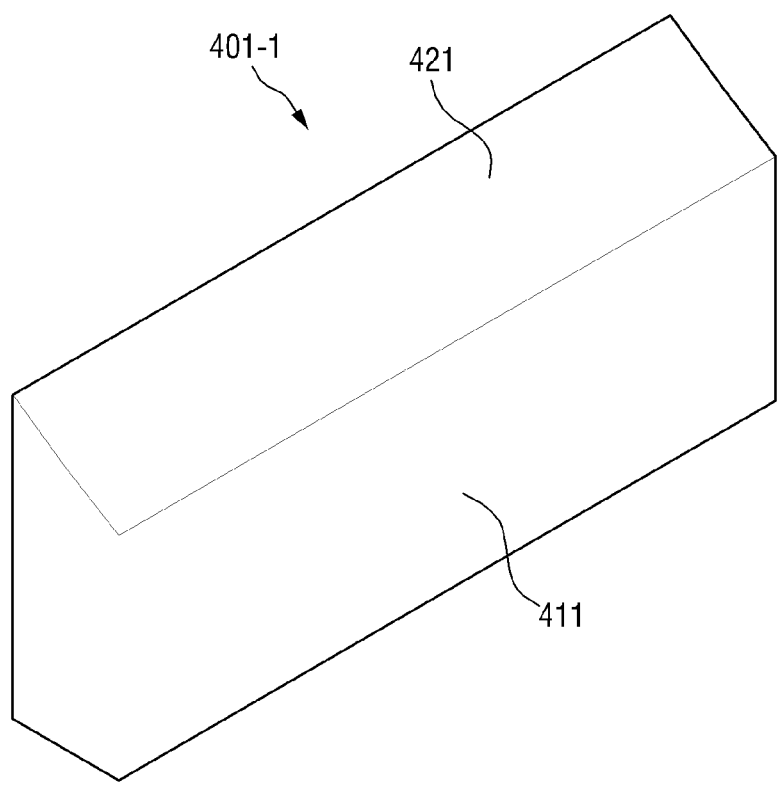
FIGS. 7 to 16 are perspective views of another exemplary embodiment of a lower container according to the invention.

As shown in FIG. 6, a supporter 401 may include a column 410 that comes in contact with the bottom surface 100 and projects upward and a support surface 420 supporting the optical member, and the support surface 420 may be provided to be inclined with reference to the column 410. Further, as shown in FIG. 7, the projecting column 411 may extend long in one direction (e.g., along Y axis in FIG. 23). In an exemplary embodiment, the supporter 401-1 of FIG. 7 may be provided to extend in a direction that is perpendicular to the one direction of the bottom surface. The support surface 421 may be provided to be inclined with reference to the column 411.

Figure 8:
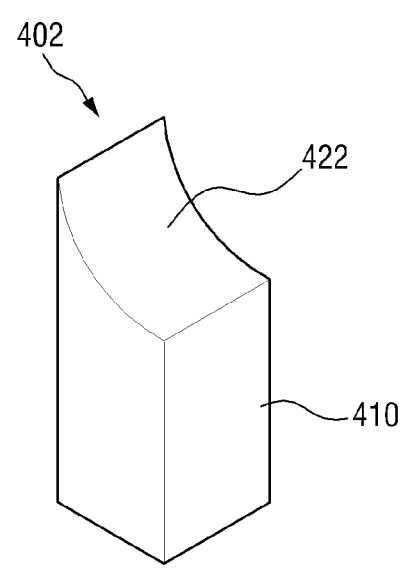
Figure 9:
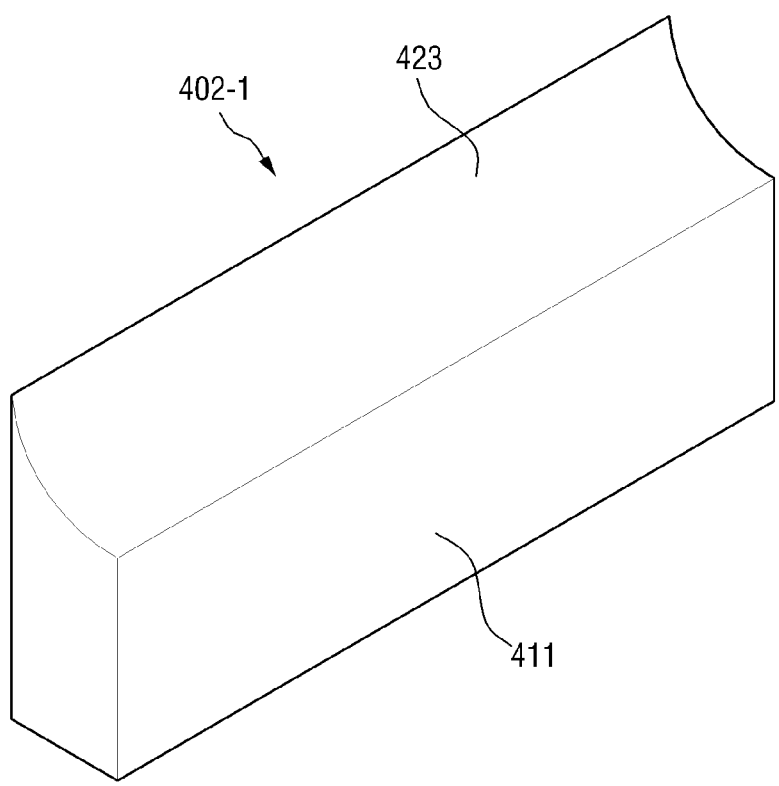

As shown in FIG. 8, a supporter 402 may include a curved support surface 422, and as shown in FIG. 9, a projecting column 411 of the supporter 402-1 may be provided to extend long. In an exemplary embodiment, the supporter 402-1 of FIG. 9 may be provided to extend in a direction that is perpendicular to the one direction of the bottom surface. The support surface 423 may be provided to be inclined with reference to the column 411.

Figure 10:
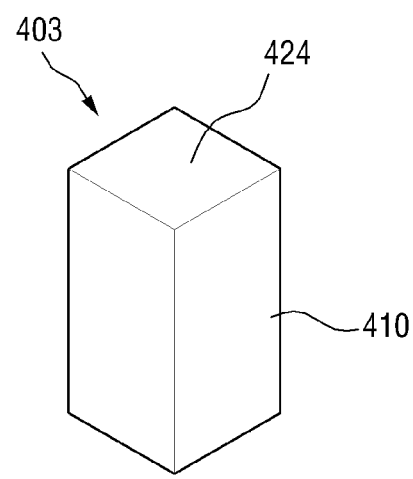

A supporter 403 of FIG. 10 may include a support surface 424 that is perpendicular to a projecting column 410. The support surface 424 may be provided as a flat surface having no inclination, or may be provided to extend the projecting column 410 like the projecting column 411 of a supporter 403-1 of FIG. 11. In an exemplary embodiment, the supporter 403-1 of FIG. 11 may be provided to extend in a direction that is perpendicular to the one direction of the bottom surface. The support surface 425 may be provided to be inclined with reference to the column 411.

As illustrated in FIGS. 12 to 15, supporters according to the invention may be supporters 404, 404-1, 405, and 405-1 of which the support surfaces have inclination opposite to the inclination of the supporters 401, 401-1, 402, and 402-1 as illustrated in FIGS. 6 to 9.

Figure 11:
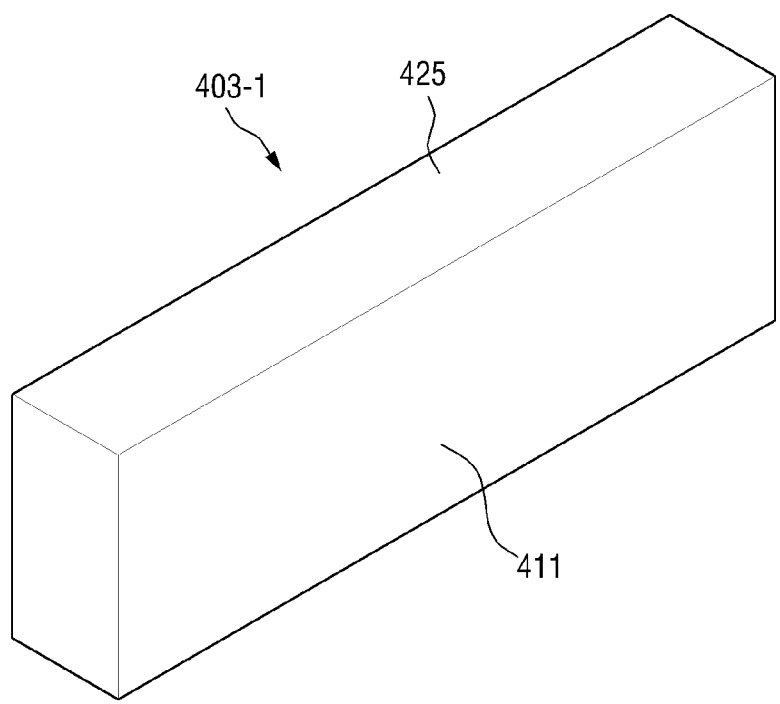
Figure 12:
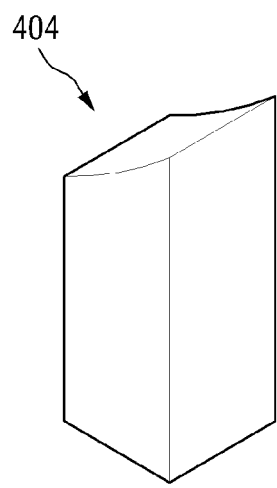

The arrangement of the supporters will be described on the basis of the cross-sectional view of FIG. 5. The supporters 401, 401-1, 402, and 402-1 may be arranged on the left side of the bottom surface of the lower container 150, and the optical member 500 seated on the upper portion thereof may be inclined downward on the right side. On the right side of the bottom surface 100 of the lower container 150, supporters 404, 404-1, 405, and 405-1 as shown in FIGS. 12 to 15 may be arranged, and since the support surface has an inclination opposite to the inclination of the supporters arranged on the left side, the optical member 500 seated on the upper portion thereof may be inclined downward on the left side. On the center portion of the bottom surface 100, the supporters 403 or 403-1 having support surfaces that are not inclined may be arranged as shown in FIGS. 10 and 11, and as a result, the optical member 500 may provide a curve.

Referring back to FIG. 4, the inclination of the support surface of the supporter may be lowered in a direction towards the center portion in the one direction (e.g., X-axis direction) of the bottom surface. That is, the inclination θ2 of the supporter that is positioned on the side of the center portion may be lower than the inclination θ1 of the support surface of the supporter that is arranged on the outer portion of the left side (θ1>θ2), and the inclination θ4 of the supporter that is positioned on the side of the center portion may be lower than the inclination θ3 of the support surface of the supporter that is arranged on the outer portion of the right side (θ3>θ4).

Figure 16:
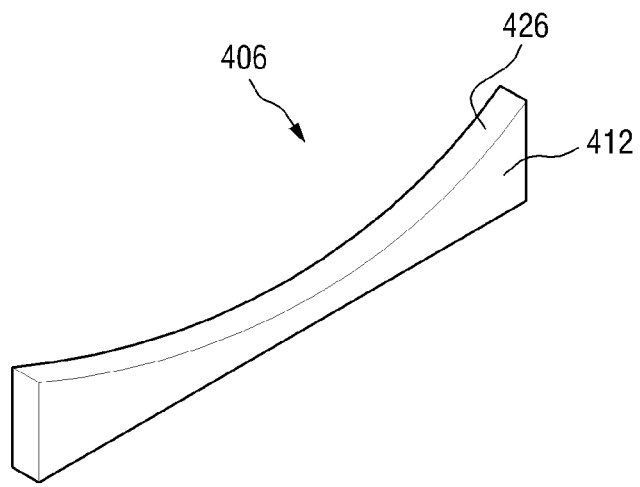
Figure 17:
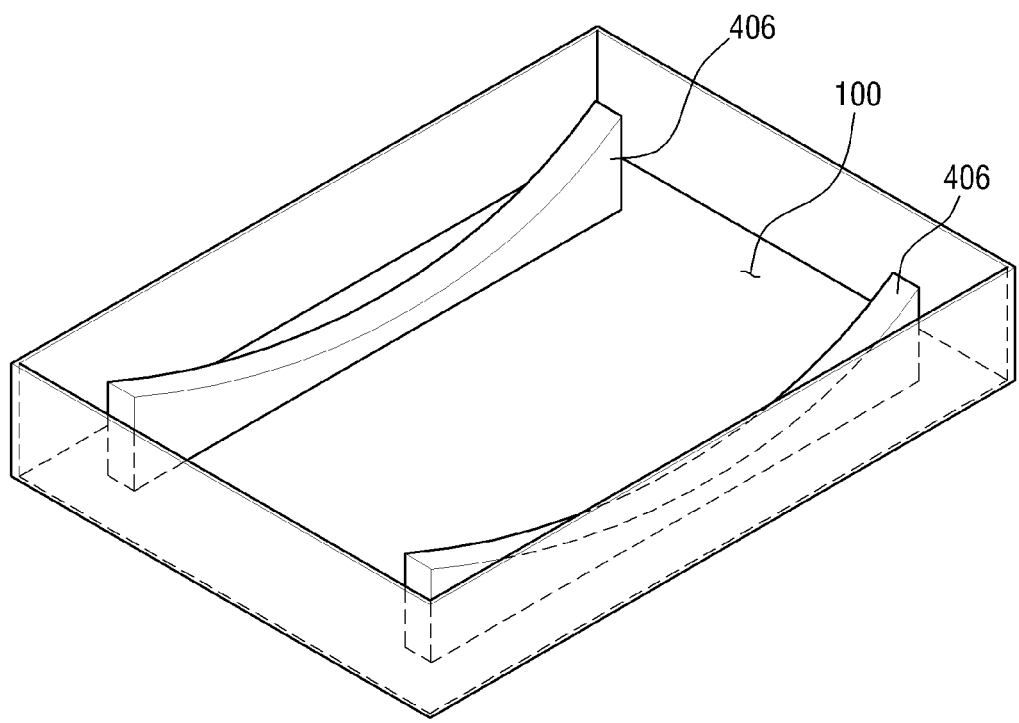
FIG. 17 is a perspective view of another exemplary embodiment of a lower container according to the invention.
Figure 18:
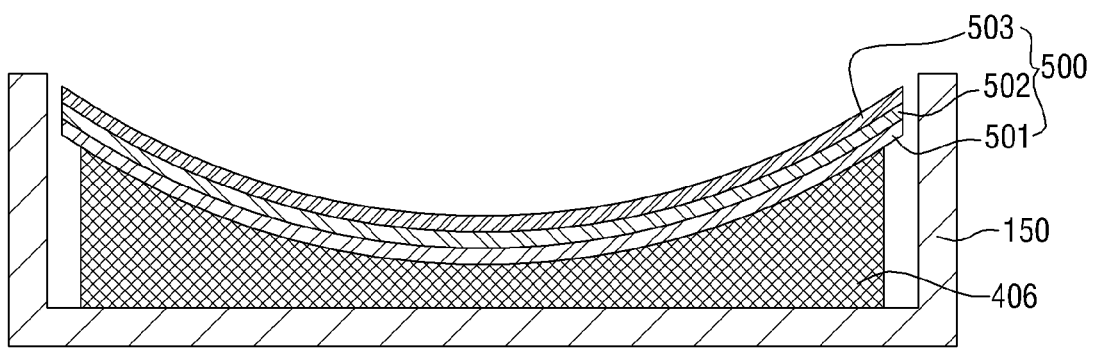
FIG. 18 is a cross-sectional view of the lower container of FIG. 17, in which an optical member is seated.

Like a supporter 406 of FIG. 16, a bottom surface of a projecting column 412 may extend in one direction, and a support surface 426 may be in a curved shape that is lowered in a direction towards the center portion in one direction of the bottom surface. Accordingly, as shown in FIGS. 17 and 18, a curve may be given to the optical member 500 by arranging the supporter 406 in parallel to one direction of the bottom surface 100, arranging the supporter 406 at both ends of the bottom surface 100, and seating the optical member 500 on the upper portion of the supporter 406. In an exemplary embodiment, the optical member 500 may include a prism sheet 503, which will be described in detail later.

Figure 13:
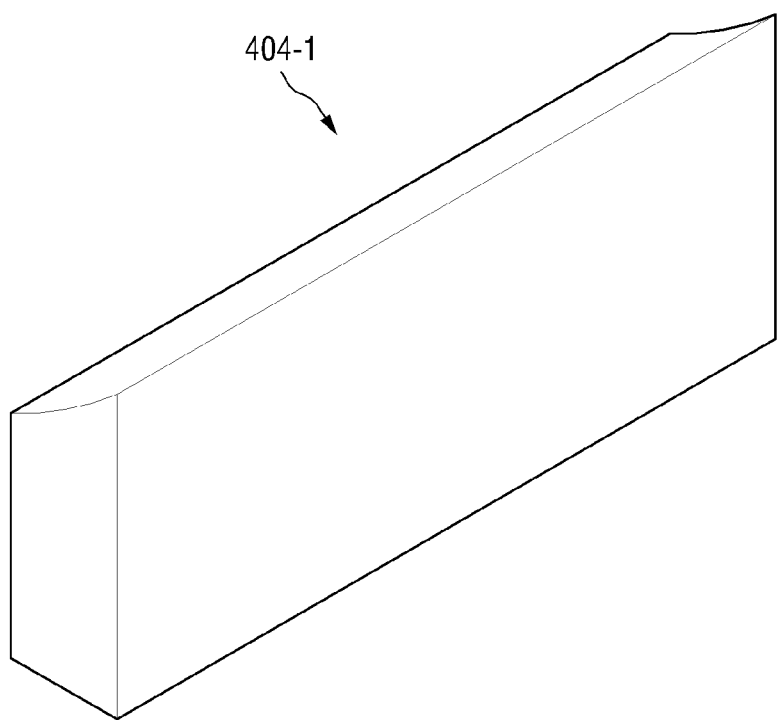
Figure 14:
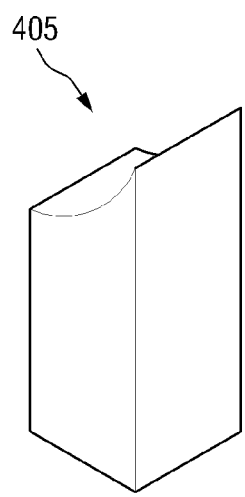
Figure 15:
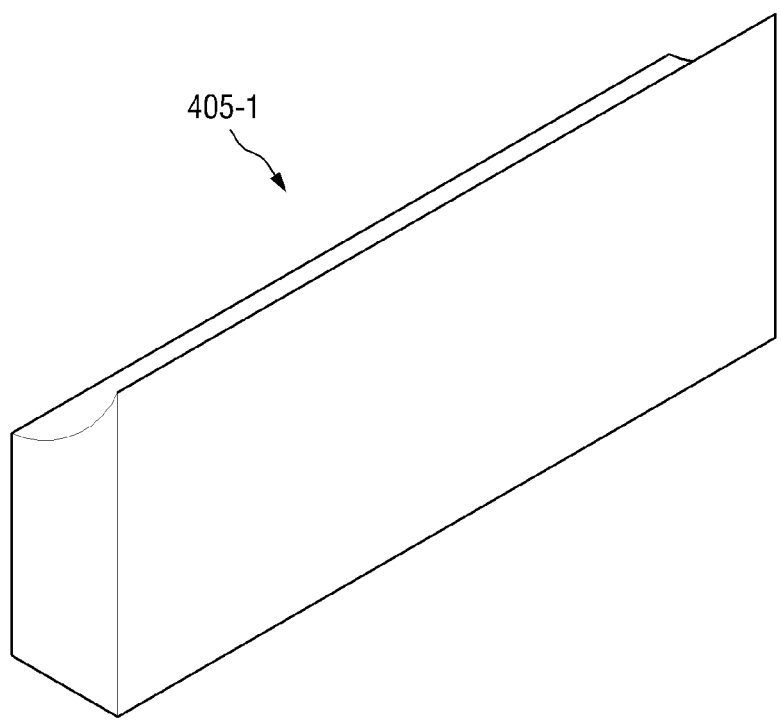
Figure 19:
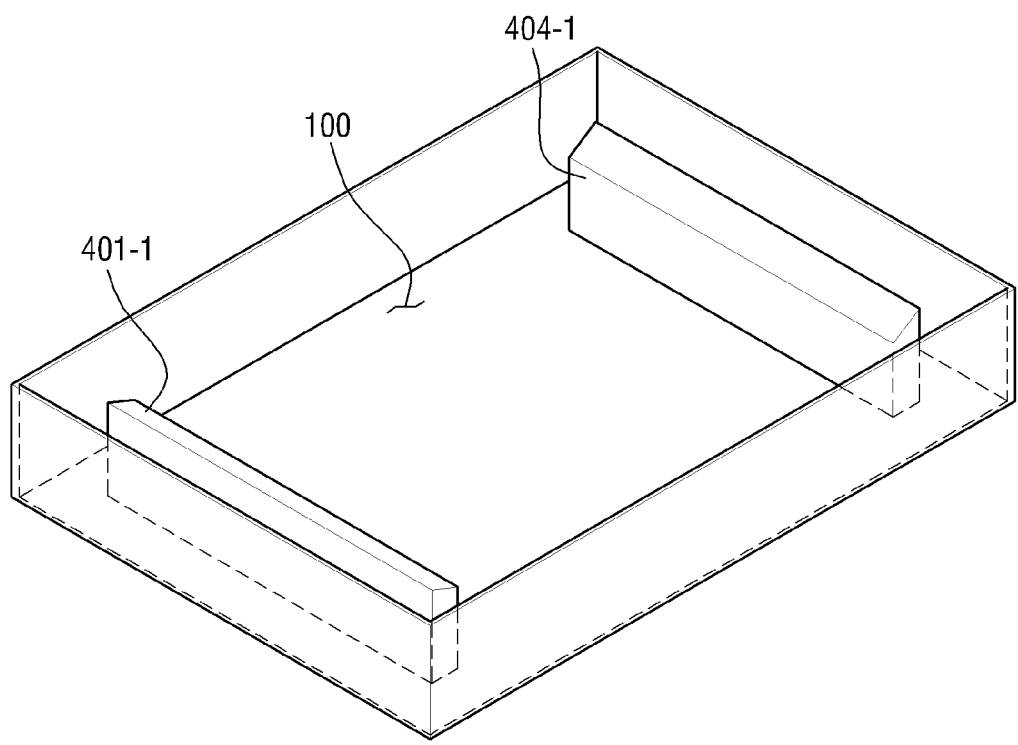
FIGS. 19 to 21 are perspective views of another exemplary embodiment of a lower container according to the invention.

The supporters may be provided in various arrangements and combinations, and for example, as shown in FIG. 19, the supporters 401-1 and 404-1 of FIGS. 7 and 13, of which the projecting columns vertically extend in one direction of the bottom surface 100, may be arranged in parallel at both ends that are perpendicular to the one direction of the bottom surface. In this case, instead of the supporters of FIGS. 7 and 13, the supporters 402-1 and 405-1 having curved support surfaces as shown in FIGS. 9 and 15 may be arranged.

Figure 20:
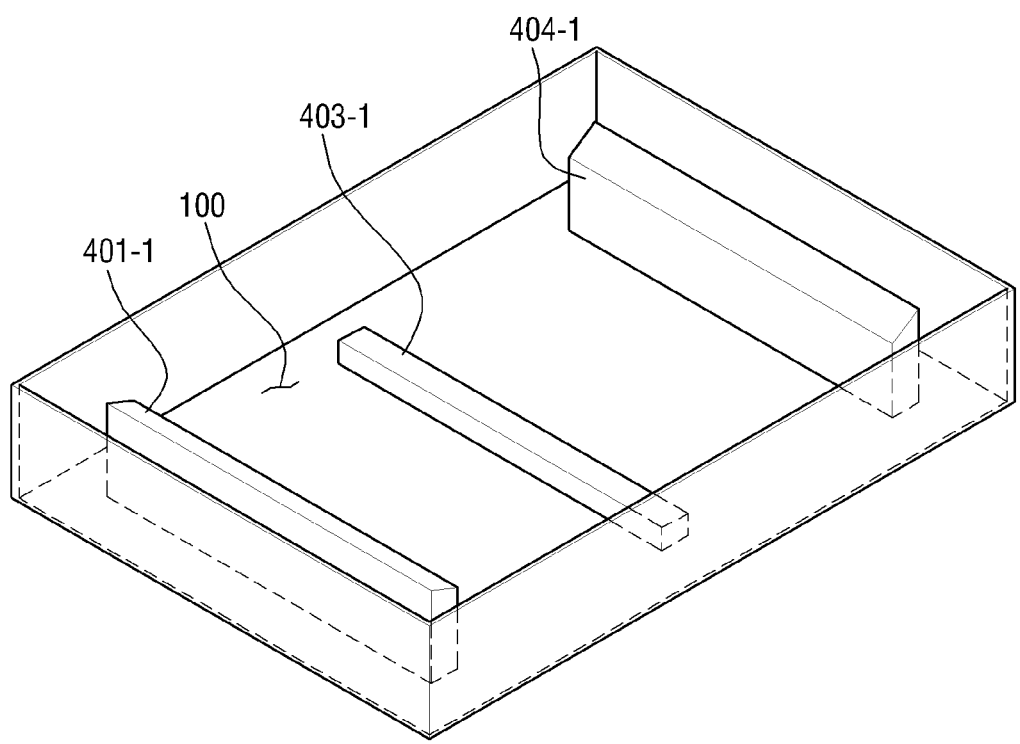
Figure 21:
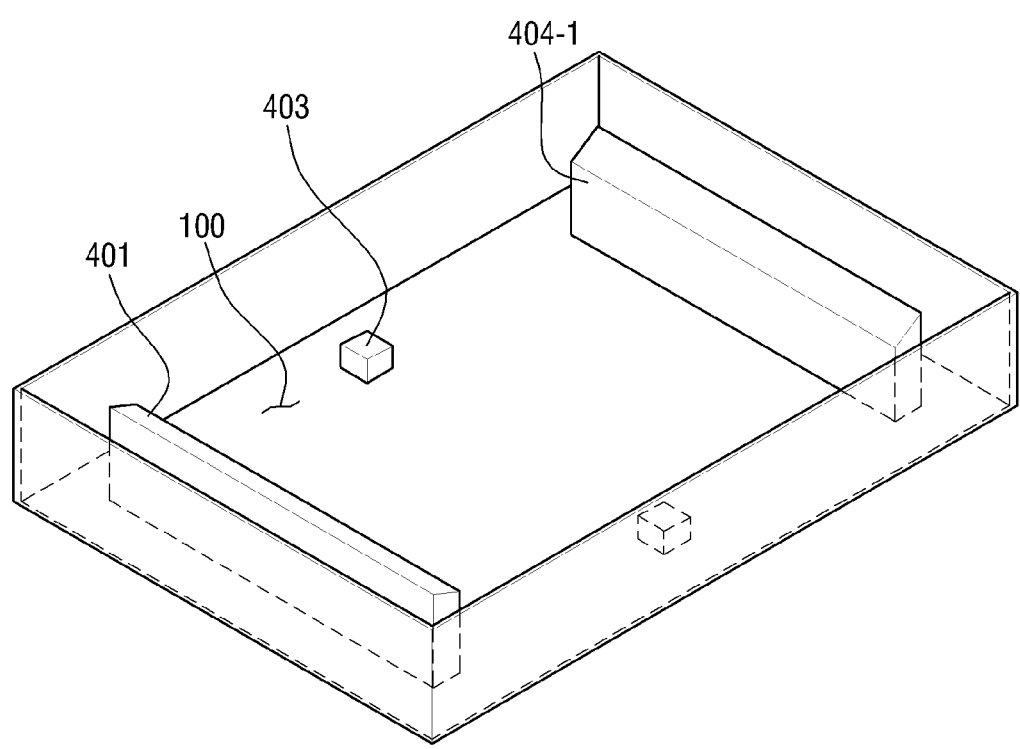

Further, as illustrated in FIG. 20, as the supporter arranged in FIG. 19, the supporter 403-1 of FIG. 11 may be arranged on the center portion of the bottom surface 100, and as illustrated in FIG. 21, as the supporters arranged in FIG. 19, a plurality of supporters 403 of FIG. 10 may be arranged on the center portion of the bottom surface 100.

More specifically, supporters arranged on both end sides of the center portion in one direction of the bottom surface 100 may be symmetrically arranged, and a supporter having the support surface that is not inclined may be arranged on the center portion. Further, in an exemplary embodiment, the supporter itself may be concavely curved toward the center portion in one direction of the bottom surface, and by arranging the supporters in parallel to each other in one direction of the bottom surface 100, the optical member 500 that is stacked on the upper portion may be curved.

The supporters according to the invention may be arranged in combination of the exemplary embodiments in addition to the various embodiments as described above with reference to the drawings, and all embodiments that can be easily combined by those of ordinary skill in the art may be included in the invention.

Referring back to FIG. 3, the optical member 500 may be arranged on the supporter 400, and when it is assumed that one direction of the bottom surface 100 is an X-axis, the optical member 500 may be concavely curved toward the center portion in the X-axis direction. The optical member 500 may include an optical plate and an optical sheet, and for example, may include a diffusion plate 501 and a prism sheet 502. When necessary, the optical member 500 may additionally include a diffusion sheet (not illustrated). The diffusion plate 501 or the diffusion sheet may uniformly diffuse light incident from the light source by means of a diffusion material or a diffusion plate included therein, and the prism sheet 502 may condense the light that is transferred from the diffusion plate 501 or the diffusion sheet in a direction perpendicular to the display panel of the upper portion.

Figure 22:
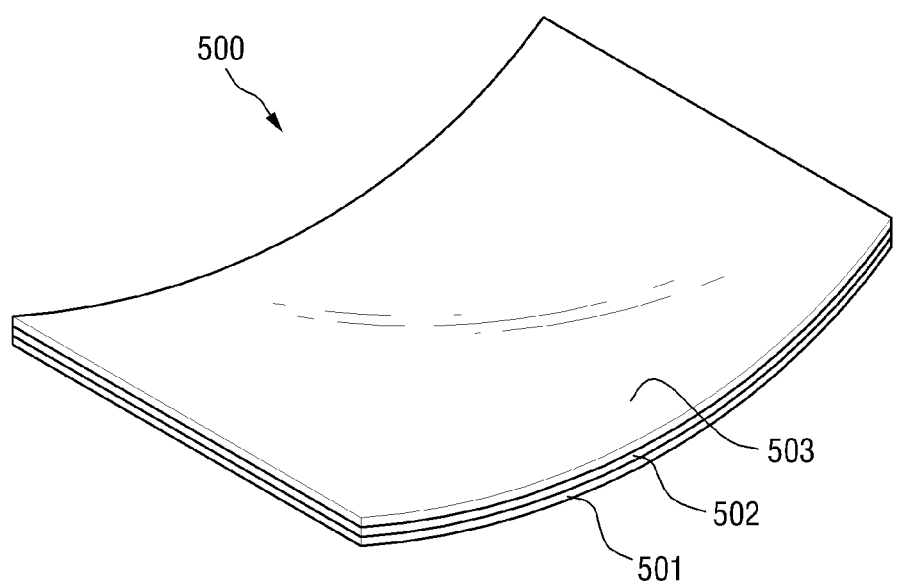
FIG. 22 is a perspective view of an exemplary embodiment of an optical member according to the invention.

As illustrated in FIG. 22, the optical member 500 may additionally include a prism sheet 503 in addition to the diffusion plate 501 and the prism sheet 502 to improve the light condensing performance. Although not illustrated in the drawing as a whole, in exemplary embodiments, the optical member 500 may include all sheets or plates that can improve the optical functions of a micro lens array sheet, a lenticular lens sheet, and a light guide plate. In exemplary embodiments, an arrangement of the sheets or plates in the optical member 500 may be modified, and when necessary, several sheets of the same optical plates or sheets may be used in the optical member 500.

A light source 250 may be disposed on the bottom surface 100 of the lower container 150, and a plurality of light sources 250 may be arranged between the optical member 500 and the bottom surface 100. On the bottom surface 100, the light sources 250 may be provided in positions that do not overlap the supporters 400, and in the invention, explanation of the detailed positional relationship between the supporters and the light sources will be omitted.

The density of the light sources 250 may be increased in a direction towards the center portion in one direction of the bottom surface 100. As described above, since the optical member 500 is concavely curved in a direction toward the center portion in one direction of the bottom surface 100, and the light sources are disposed on the flat bottom surface 100, there may be a difference in gap between the light sources 250 and the optical member 500. In an exemplary embodiment, in the case where a diffusion plate is positioned on the upper portion of the light sources 250 as the optical member 500, the light source of the center portion that is arranged relatively close to the optical member 500 may have a low diffusion level, and the light source of the outer portion that is arranged relatively far from the optical member 500 may have a high diffusion level to cause a difference between a bright portion and a dark portion to be increased.

According to the invention, a curved concave surface is provided on the center portion in one direction of the bottom surface, and thus the density of the light sources is increased on the portion where the distance between the optical member and the bottom surface is relatively short to compensate for the low-level diffusion. Further, on the outer portion in one direction of the bottom surface, that is, on the portion where the distance between the optical member and the bottom surface is relative long, the diffusion is performed at high level even when the density of the light sources is decreased, and thus the luminance difference can be adjusted on the upper surface of the optical member.

Hereinafter, referring to FIGS. 23 to 26, light sources will be described.

The light sources 250 may include a plurality of PCBs 200 on which a plurality of light emitting diode ("LED") packages 300 are arranged in a line. The LED package 300 and the PCB 200 may be connected to each other through an electrode (not illustrated), and the LED package 300 may emit light according to a voltage that is applied to the PCB. The LED package 300 may include a plurality of LED packages 301 on the center portion and a plurality of LED packages 302 on the outer portion. Since driving of the LED packages is well known in the art, the detailed description thereof will be omitted.

Figure 23:
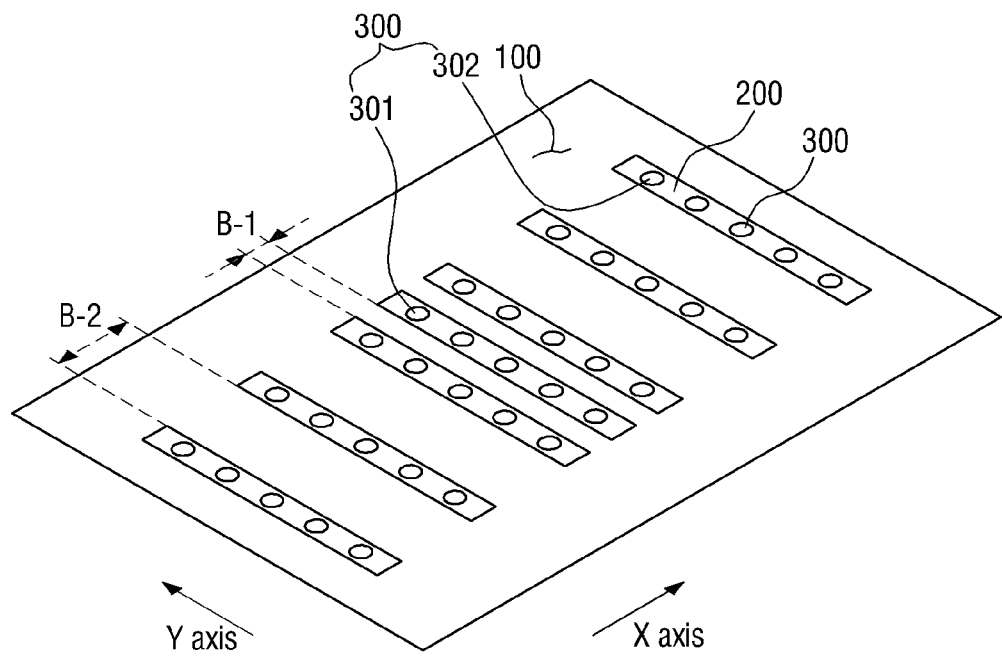
FIG. 23 is a perspective view of an exemplary embodiment of a light source arrangement according to the invention.

Referring to FIG. 23, the plurality of PCBs 200, on which the LED packages 300 are mounted, may be arranged in parallel to the direction (X axis) that is perpendicular to the one direction (Y axis) of the bottom surface 100. That is, the plurality of LED packages 300 may be arranged on each PCB 200, and the plurality of PCBs 200 may be arranged in parallel to the X axis, and extended in parallel to the Y axis. In this case, the gap between the neighboring PCBs 200 may be shortened in a direction towards the center portion in the one direction (X axis) of the bottom surface 100. That is, the gap B-1 between the PCBs that are positioned on the center portion based on the X axis may be shorter than the gap B-2 between the PCBs that are positioned on the outer portion. In this case, on the center portion of the X axis of the bottom surface 100, the number of LED packages 300 is increased per a unit area and thus the density of the light sources is increased.

Figure 24:
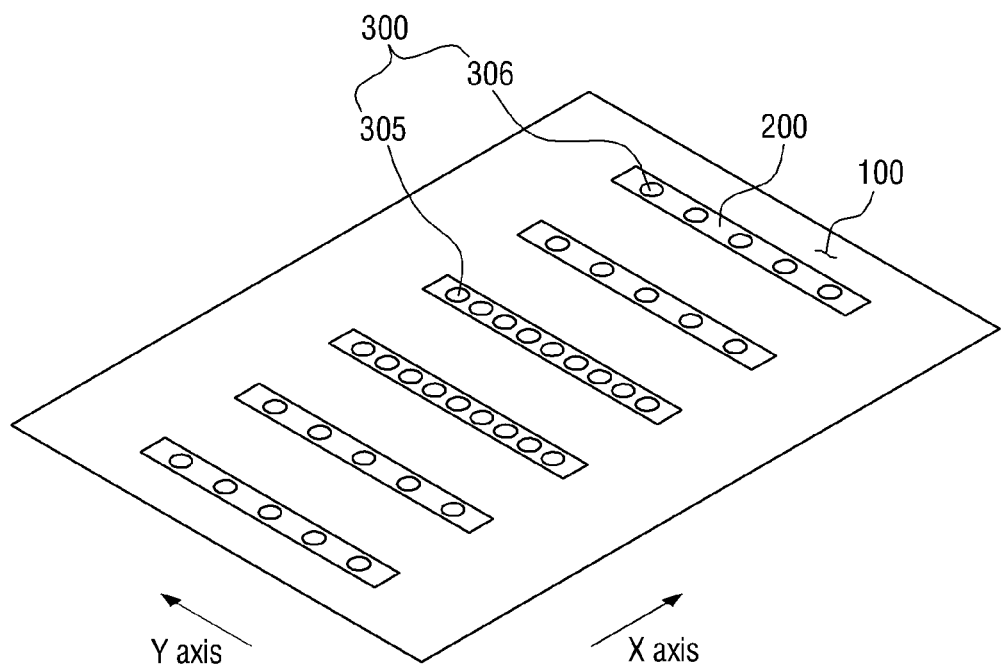
FIG. 24 is a perspective view of another exemplary embodiment of a light source arrangement according to the invention.

Referring to FIG. 24, the density of the light sources may be adjusted by increasing the number of LED packages 300 arranged on the PCB 200 in a direction towards the center portion in one direction (X axis) of the bottom surface. That is, the density of the light sources 250 (refer to FIG. 1) may be adjusted by arranging the plurality of LED packages 305 on the PCBs 200 that are arranged on the center portion, and decreasing a number of LED packages 306 in a direction towards the outer portion while constantly maintaining the arrangement gap between the PCBs 200.

The PCBs 200 may be driven with relatively low current as the PCBs are disposed closer to the center portion in one direction of the bottom surface, and PCBs 200 closer to the center portion may include low-luminance LED packages. In an exemplary embodiment, the LED packages 301 and 305 arranged on the center portion as shown in FIGS. 23 and 24 may include the LED packages that emit low-luminance light as compared with the LED packages 302 and 306 arrange on the outer portion, or the PCBs that are positioned on the center portion may be driven with low current.

Since the density of the light sources is increased in direction towards the center portion in one direction of the bottom surface, the luminance on the center portion may be higher than the luminance on the outer portion of the display panel. Accordingly, by lowering the luminance of the light emitted from the center portion or driving the display panel with low current, the above-described luminance imbalance can be solved, the luminance can be adjusted by turning on the LED packages on the center portion in addition to the lowering of the luminance or driving with low current.

Figure 25:
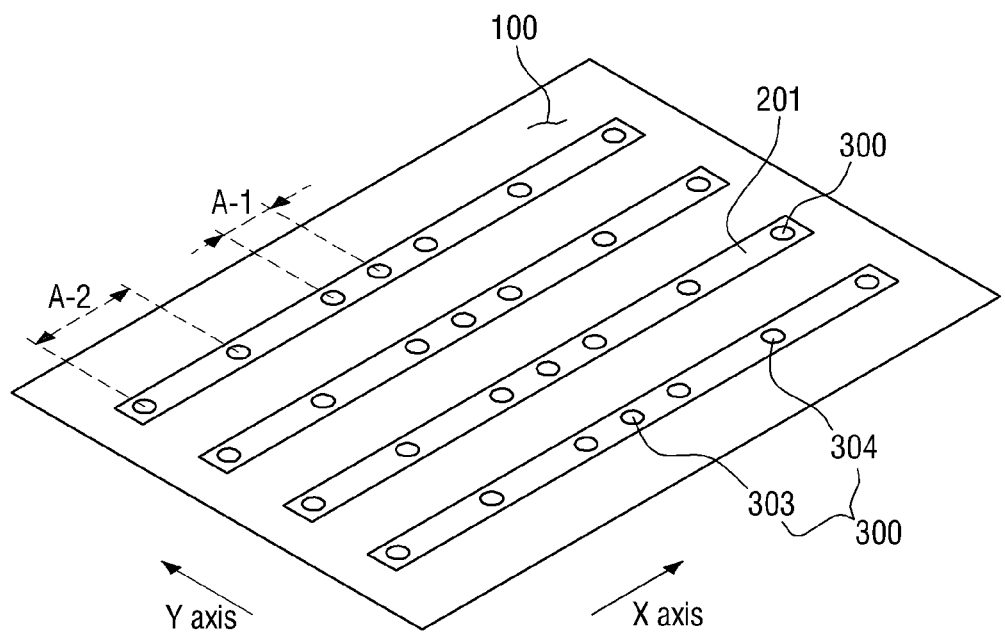
FIG. 25 is a perspective view of still another exemplary embodiment of a light source arrangement according to the invention.

Referring to FIG. 25, the plurality of PCBs 201 may be arranged in parallel to one direction (Y axis) of the bottom surface 100. In this case, in order to increase the density of the light sources in a direction towards the center portion in the one direction (X axis) of the bottom surface 100, the gap between the LED packages 300 arranged on the PCB may be shortened as the LEDs are closer to the center portion in the one direction of the bottom surface. That is, the density of the LED packages 300 arranged on the center portion of the X axis may be increased by shortening the arrangement gap A-1 of the LED packages 300 arranged on the PCB that is arranged in parallel to the X axis as compared with the arrangement gap A-2 between the LED packages 300 arranged on the outer portion.

Even in the case of the backlight unit on which the light sources are arranged, the PCB 201 may include the low-luminance LED packages 303 as the PCB 201 is closer to the center portion in the one direction of the bottom surface 100. In an exemplary embodiment, by making the LED packages 303 arranged on the center portion emit light of relatively low luminance as compared with the LED packages 304 arrange on the outer portion, the luminance distribution of the light that is directed to the display panel can be adjusted. Further, by arranging the LED packages that are driven with low current closer to the center portion of the one direction, the luminance distribution can be adjusted. Since the detailed contents thereof have been described with reference to FIG. 24, the duplicate explanation thereof will be omitted.

A display device according to an exemplary embodiment of the invention may include a lower container including a flat bottom surface, an upper container having a concave curve provided toward a center portion in one direction of the bottom surface, an optical member interposed between the lower container and the upper container and including a shape that corresponds to a shape of the upper container, a light source provided between the optical member and the bottom surface, and a display panel arranged on the upper container and including the shape that corresponds to the shape of the upper container.

Figure 26:
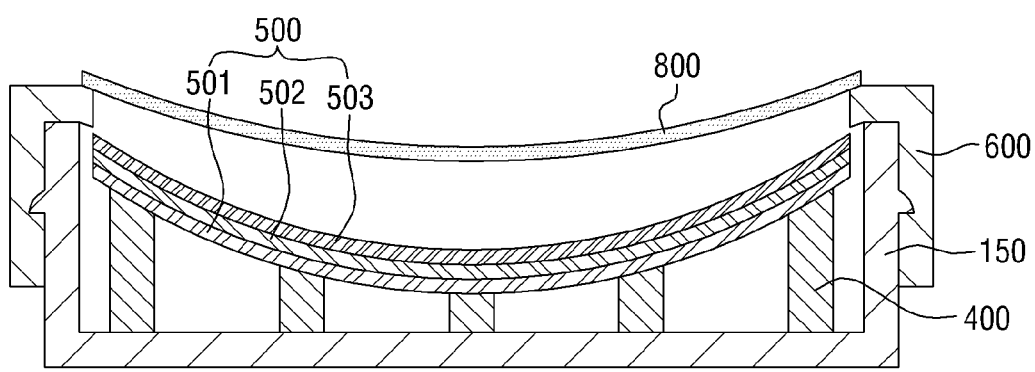
FIG. 26 is a cross-sectional view of an exemplary embodiment of a backlight unit on which a display panel is seated according to the invention.

Referring to the cross-sectional view of FIG. 26, on the upper portion of the optical member 500, an upper container 600 may be further included, and the optical member 500, the supporters 400, and the light sources 250 may be accommodated between the upper container 600 and the lower container 150. The upper container 600 may be engaged with the lower container to accommodate the optical member 500. The shape of the upper container 600 may correspond to the shape of the optical member 500. That is, since the upper container 600 is concavely curved toward the bottom surface 100 (refer to FIG. 1) in a direction towards the center portion in the one direction of the bottom surface, the optical member 500 that is seated on the supporters can maintain the shape of the curve. Further, since the upper container 600 has a hollow space or includes a transparent material to define an opening 620 therein, the light provided from the backlight unit can permeate a display panel 800 seated on the upper portion of the upper container.

Although not illustrated, the display panel 800 may include a liquid crystal layer interposed between thin film transistor ("TFT") substrates, a color filter substrate, a polarizing filter, and a driving integrated circuit ("IC"), and may function to display an image through adjustment of the strength of light that is incident from the backlight unit. Since the details of the display panel are well known in the art, the detailed explanation thereof will be omitted.

Figure 27:
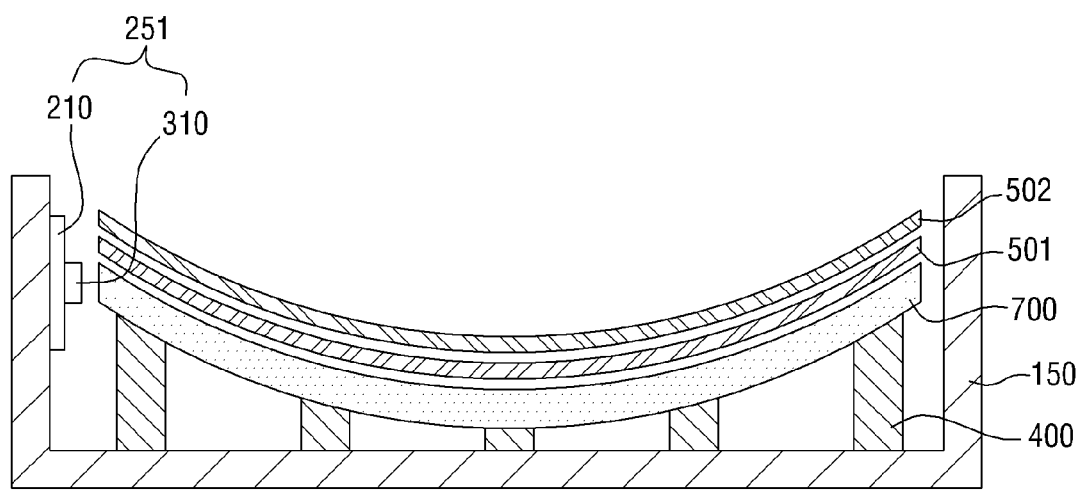
FIG. 27 is a cross-sectional view of another exemplary embodiment of a backlight unit according to the invention.

Referring to FIG. 27, a display device according to another embodiment of the invention will be described. The display device may include a lower container 150 including a flat bottom surface 100 and a plurality of side wall portions 120 (refer to FIG. 1), an upper container having a concave curve provided toward a center portion in one direction of the bottom surface 100, a light guide plate 700 interposed between the lower container 150 and the upper container and including a shape that corresponds to a shape of the upper container, a light source 251 arranged on the at least one side wall portion 120 and a side surface of the light guide plate 700 and including a PCB 210 and LED packages 310, and a display panel arranged on the upper container and including the shape that corresponds to the shape of the upper container.

In an exemplary embodiment, the light guide plate may comprise a reflection pattern. And the density of a reflection pattern of the light guide plate may be increased to heighten the reflectivity as the reflection pattern gets far from the light source. Since the quantity of reaching light is reduced as getting far from the light source, the reflection pattern may be provided at high density to make a large quantity of light reach the upper display panel.

Figure 28:
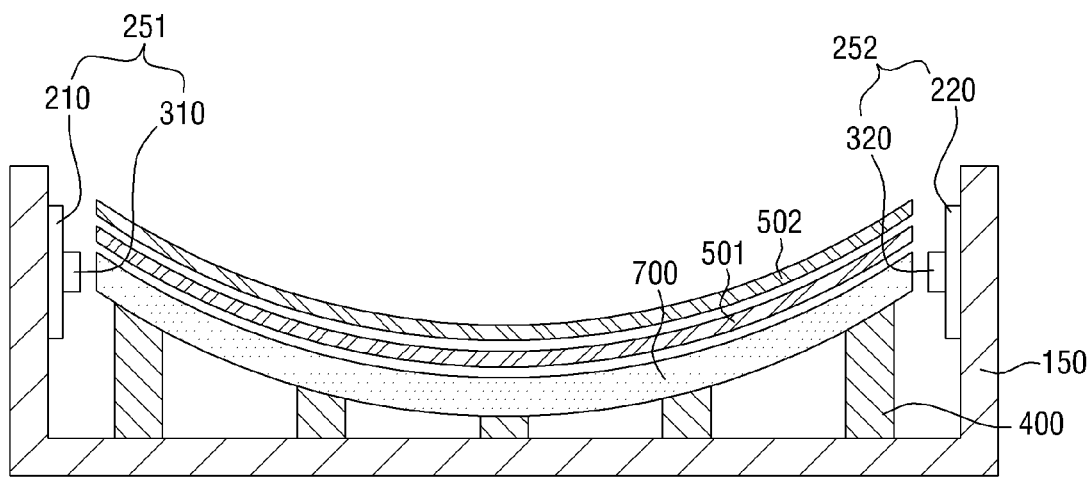
FIG. 28 is a cross-sectional view of still another exemplary embodiment of a backlight unit according to the invention.

Referring to FIG. 28, the light sources 251 and 252 may be arranged to face both side wall portions of the lower container 150. The light source 252 may include a PCB 220 and LED packages 320.

The display device may further include a top chassis for fixing the display panel, and the top chassis may include a concave curve provided toward the center portion in the one direction of the bottom surface. Further, the top chassis may include a display window so that a viewer can view an image that is provided from the display panel. Since the details of the top chassis are well known in the art, the detailed explanation thereof will be omitted.

However, the effects of the invention are not restricted to the one set forth herein. The above and other effects of the invention will become more apparent to one of daily skill in the art to which the invention pertains by referencing the claims.

While the invention has been particularly shown and described with reference to exemplary embodiments thereof, it will be understood by those of ordinary skill in the art that various changes in form and detail may be made therein without departing from the spirit and scope of the invention as defined by the following claims. The exemplary embodiments should be considered in a descriptive sense only and not for purposes of limitation.

What is claimed is:

1. A backlight unit comprising:
a lower container including a bottom surface which is flat;
an optical member accommodated in the lower container, having a concave curve along one direction of the bottom surface and protruding toward a center portion of the bottom surface;
a plurality of supporters which contacts the bottom surface and projects toward the optical member to support the optical member; and
a plurality of light sources disposed on the bottom surface and arranged between the optical member and the bottom surface,
wherein a density of the plurality of light sources increases as a distance between the optical member and the bottom surface decreases.

2. The backlight unit of claim 1, wherein heights of the plurality of supporters decrease along the one direction towards the center portion of the bottom surface.

3. The backlight unit of claim 2, wherein the plurality of supporters is disposed in a plurality of lines extended parallel to the one direction of the bottom surface.

4. The backlight unit of claim 1, wherein the plurality of supporters is disposed at four corners of the bottom surface, respectively.

5. The backlight unit of claim 1, wherein
the plurality of supporters respectively comprises a column which contacts the bottom surface and projects upward, and a support surface which is configured to support the optical member, and
inclinations of the support surfaces of the plurality of supporters become smaller in the one direction towards the center portion of the bottom surface.

6. The backlight unit of claim 2, wherein
the plurality of supporters respectively extends parallel to the one direction of the bottom surface, and opposing ends thereof face opposing ends of the bottom surface in the one direction, and each supporter is curved along the one direction of the bottom surface, and a height of the supporter decreases in the one direction towards the center portion of the bottom surface.

7. The backlight unit of claim 1, further comprising an upper container arranged on an upper portion of the optical member,
wherein
the optical member, the plurality of supporters and the plurality of light sources are accommodated between the upper container and the lower container, and
a shape of the upper container corresponds to a shape of the optical member.

8. The backlight unit of claim 1, wherein
the plurality of light sources respectively comprises a plurality of printed circuit boards on which a plurality of light emitting diode packages is arranged in a line, and
the plurality of printed circuit boards is arranged in a direction which is perpendicular to the one direction of the bottom surface.

9. The backlight unit of claim 8, wherein a gap between neighboring printed circuit boards of the plurality of printed circuit boards is shortened in the one direction towards the center portion of the bottom surface.

10. The backlight unit of claim 8, wherein the number of the plurality of light emitting diode packages arranged on a printed circuit board of the plurality of printed circuit boards is increased in the one direction towards the center portion of the bottom surface.

11. The backlight unit of claim 9, wherein driving currents of the plurality of printed circuit boards are decreased in the one direction towards the center portion of the bottom surface.

12. The backlight unit of claim 9, wherein luminances of the plurality of light emitting diode packages are lowered in the one direction towards the center portion of the bottom surface.

13. The backlight unit of claim 1, wherein
the light source comprises a plurality of printed circuit boards on which a plurality of light emitting diode packages is arranged in a line, and
the plurality of printed circuit boards is arranged in the one direction of the bottom surface.

14. The backlight unit of claim 13, wherein a gap between neighboring light emitting diode packages of the plurality of light emitting diode packages of the printed circuit board is shortened in the one direction towards the center portion of the bottom surface.

15. The backlight unit of claim 14, wherein luminances of the plurality of light emitting diode packages are lowered in the one direction towards the center portion of the bottom surface.

16. The backlight unit of claim 13, wherein driving currents of the plurality of light emitting diode packages are decreased in the one direction towards the center portion of the bottom surface.

17. A display device comprising:
a lower container including a flat bottom surface;
an upper container having a concave curve along one direction of the bottom surface and protruding toward a center portion of the bottom surface;
an optical member interposed between the lower container and the upper container, and including a shape which corresponds to a shape of the upper container;
a plurality of light sources disposed between the optical member and the bottom surface; and
a display panel arranged on an upper portion of the upper container which is opposite to a lower portion of the upper container facing the bottom surface of the lower container and including the shape which corresponds to the shape of the upper container,
wherein a density of the plurality of light sources increases as a distance between the optical member and the bottom surface decreases.

18. The display device of claim 17, further comprising a top chassis which fixes the display panel,
wherein the top chassis includes a concave curve along the one direction of the bottom surface and protruding toward the center portion of the bottom surface.

19. A display device comprising:
a lower container including a flat bottom surface and a plurality of side wall portions;
an upper container having a concave curve along one direction of the bottom surface and protruding toward a center portion of the bottom surface;
a light guide plate interposed between the lower container and the upper container and including a shape which corresponds to a shape of the upper container;
a light source arranged on a side wall portion of the lower container and a side surface of the light guide plate;
a plurality of supporters disposed between the flat bottom surface of the lower container and the light guide plate, and in contact with the flat bottom surface and the light guide plate to support the light guide plate; and
a display panel arranged on an upper portion of the upper container which is opposite to a lower portion of the upper container facing the bottom surface of the lower container and including the shape which corresponds to the shape of the upper container.

20. The display device of claim 19, wherein the light guide plate comprises a reflection pattern, and a density of a reflection pattern of the light guide plate is increased as the reflection pattern is further from the light source.

* * * * *